United States Patent
Barratt et al.

(10) Patent No.: US 6,185,440 B1
(45) Date of Patent: Feb. 6, 2001

(54) METHOD FOR SEQUENTIALLY TRANSMITTING A DOWNLINK SIGNAL FROM A COMMUNICATION STATION THAT HAS AN ANTENNA ARRAY TO ACHIEVE AN OMNIDIRECTIONAL RADIATION

(75) Inventors: Craig H. Barratt, Redwood City; David M. Parish, Los Altos; Christopher R. Uhlik, Milpitas; Stephen Boyd, Stanford; Louis C. Yun, Mountain View; Marc H. Goldburg, Redwood City, all of CA (US)

(73) Assignee: ArrayComm, Inc., San Jose, CA (US)

( * ) Notice: Under 35 U.S.C. 154(b), the term of this patent shall be extended for 0 days.

(21) Appl. No.: 09/020,619

(22) Filed: Feb. 9, 1998

Related U.S. Application Data

(63) Continuation-in-part of application No. 08/988,519, filed on Dec. 10, 1997.

(51) Int. Cl.[7] ................................................ H04B 1/38
(52) U.S. Cl. ........................ 455/562; 455/103; 370/334
(58) Field of Search .................................. 455/562, 561, 455/103, 105, 107, 129; 370/334; 375/135, 146

(56) References Cited

U.S. PATENT DOCUMENTS

| | | | |
|---|---|---|---|
| 5,576,717 | * 11/1996 | Searle et al. | 342/373 |
| 5,649,287 | 7/1997 | Forssén et al. | 370/312 |
| 5,819,182 | * 10/1998 | Gardner et al. | 455/562 |
| 5,825,762 | * 10/1998 | Kamin, Jr. et al. | 370/335 |
| 5,828,658 | * 10/1998 | Ottersten et al. | 370/310 |
| 5,914,946 | * 6/1999 | Avidor et al. | 370/336 |
| 5,999,826 | * 12/1999 | Whinnett | 455/562 |
| 6,018,643 | * 1/2000 | Golemon et al. | 455/562 |

FOREIGN PATENT DOCUMENTS

| | | | |
|---|---|---|---|
| 0 639 035 A1 | 2/1995 | (EP) | H04Q/7/36 |
| 0 777 400 A2 | 6/1997 | (EP) | H04Q/7/36 |
| 2 295 524 | 5/1996 | (GB) | H04Q/7/30 |
| 2 313 261 | 11/1997 | (GB) | H04B/7/06 |

* cited by examiner

*Primary Examiner*—Edward F. Urban
*Assistant Examiner*—Tilahun Gesesse
(74) *Attorney, Agent, or Firm*—Dov Rosenfeld; Inventek

(57) ABSTRACT

This invention relates to a method and apparatus for transmitting a downlink signal from a communication station to one or more subscriber units to achieve a desired radiation level over a desired sector (e.g., everywhere), the communication station including an array of antenna elements and one or more signal processors programmed (in the case of programmable signal processors) to weight the downlink signal according to one of a sequence of complex valued weight vectors. The method includes sequentially repeating transmitting the downlink signal, each repetition with a different weight vector from the sequence until all weight vectors in the sequence have been transmitted with. The sequence is designed for achieving the desired radiation level during at least one of the repetitions. In this way, every user in the desired region is transmitted to in the time period.

30 Claims, 5 Drawing Sheets

METHOD FOR SEQUENTIALLY TRANSMITTING A DOWNLINK SIGNAL FROM A COMMUNICATION STATION THAT HAS AN ANTENNA ARRAY TO ACHIEVE AN OMNIDIRECTIONAL RADIATION

RELATIONSHIP TO OTHER PATENTS OR PATENT APPLICATIONS

This is a continuation in part to U.S. patent application Ser. No. 08/988,519, filed on Dec. 10, 1997, entitled RADIO TRANSMISSION FROM A COMMUNICATION STATION WITH AN ANTENNA ARRAY TO PROVIDE A DESIRABLE RADIATION PATTERN (called the "Parent Patent" hereinunder). The Parent Patent is incorporated herein by reference in its entirety.

FIELD OF INVENTION

This invention relates to the field of wireless communication systems, and more specifically, to the efficient broadcast of common downlink communication channel signals in a wireless communications system by a communication station that uses a multiple element transmitting antenna array in order to achieve a near omnidirectional pattern throughout its area of coverage.

BACKGROUND TO THE INVENTION

Cellular wireless communications systems are known, wherein a geographical area is divided into cells, and each cell includes a base station (BS, BTS) for communicating with subscriber units (SUs) (also called remote terminals, mobile units, mobile stations, subscriber stations, or remote users) within the cell. In such a system, there is a need for broadcasting information from a base station to subscriber units within the cell, for example to page a particular subscriber unit in order to initiate a call to that SU, or to send control information to all subscriber units, for example on how to communicate with the base station, the control information including, for example, base station identification, timing, and synchronization data. Such paging and control information is broadcast on what are called common control channels. Because often there is no prior information regarding the location of the remote user(s) that need to receive the paging or control information, or because such information is intended for several users, it is preferable to transmit such signals omnidirectionally, or near omnidirectionally, where omnidirectional in general means that the radiated power pattern of the base station is independent of azimuth and elevation within the prescribed coverage area of the base station. This invention deals with methods and apparatuses for achieving such omnidirectional transmissions.

Some examples of a cellular system to which the present invention can be applied are analog systems using the AMPS standard, digital systems which use variants of the Personal Handy Phone System (PHS) protocol defined by the Association of Radio Industries and Businesses (ARIB) Preliminary Standard, RCR STD-28 (Version 2) December 1995, and digital systems that use the Global System for Mobile communications (GSM) protocol, including the original version, 1.8 GHz version called DCS-1800, and the North American 1.9 GHz personal communications system (PCS) version called PCS-1900, these three called "variants" of GSM herein. The PHS and GSM standards define two general sets of functional channels (also called logical channels): a control channel (CCH) set and a traffic channel (TCH) set. The TCH set includes bi-directional channels for transmitting user data between the subscriber units and a base station. The CCH set includes a broadcast control channel (BCCH), a paging channel (PCH), and several other control channels not of concern herein. The BCCH is a unidirectional downlink channel for broadcasting control information from the base station to the subscriber units that includes system and channel structure information, and the PCH is a one-way downlink channel that broadcasts information from the base station to a selected set of subscriber units, or to a wide area of multiple subscriber units (the paging area), and typically is used to alert a particular remote station of an incoming call. The present invention is applicable to all downlink broadcasts and transmissions. It is especially applicable for BCCH and PCH that are used by a base station to simultaneously transmit common information to more than one subscriber (i.e., to broadcast). It is also applicable to other situations where it is desired to transmit RF energy omnidirectionally or at least with no nulls anywhere in the intended region.

The use of antenna arrays for the radiation of radio frequency (RF) energy is well established in a variety of radio disciplines. For the purposes of transmitting in the downlink from a base station which includes an antenna array to a remote receiver (the subscriber unit), the signal intended for the SU can be provided as input to each of the radiating elements of the array, differing from element to element only by gain and phase factors, usually resulting, by design, in a directional radiation pattern focused at the subscriber unit. The benefits of this sort of transmission strategy include increased gain over that possible using a single radiating element and reduced interference to other co-channel users in the system as compared to transmission by means of a single radiating element. Using such an antenna array, spatial division multiple access (SDMA) techniques also are possible in which the same "conventional channel" (i.e., the same frequency channel in a frequency division multiple access (FDMA) system, timeslot in a time division multiple access (TDMA) system, code in a code division multiple access (CDMA) system, or timeslot and frequency in a TDMA/FDMA system) may be assigned to more than one subscriber unit.

Any downlink signals sent are received by a subscriber unit, and the received signal at such receiving subscriber unit is processed as is well known in the art.

When a signal is sent from a remote unit to a base station (i.e., communication is in the uplink), the base station typically (and not necessarily) is one that uses a receiving antenna array (usually, and not necessarily the same antenna array as for transmission). The base station signals received at each element of the receiving array are each weighted in amplitude and phase by a receive weight (also called spatial demultiplexing weight), this processing called spatial demultiplexing, all the receive weights determining a complex valued receive weight vector which is dependent on the receive spatial signature of the remote user transmitting to the base station. The receive spatial signature characterizes how the base station array receives signals from a particular subscriber unit in the absence of any interference. In the downlink (communications from the base station unit to a subscriber unit), transmission is achieved by weighting the signal to be transmitted by each array element in amplitude and phase by a set of respective transmit weights (also called spatial multiplexing weights), all the transmit weights for a particular user determining a complex valued transmit weight vector which also is dependent on what is called the "downlink spatial signature" or "transmit spatial signature" of the remote user which characterizes how the remote user receives signals from the base station absence of any interference. When transmitting to several remote users on the same conventional channel, the sum of weighted signals is transmitted by the antenna array. This invention is primarily concerned with downlink communications, although the techniques certainly are applicable also to uplink communications when the subscriber unit also uses an antenna array for transmitting and omnidirectional transmission from such a subscriber unit is desired.

In systems that use antenna arrays, the weighting of the signals either in the uplink from each antenna element in an array of antennas, or in the downlink to each antenna element is called spatial processing herein. Spatial processing is useful even when no more than one subscriber unit is assigned to any conventional channel. Thus, the term SDMA shall be used herein to include both the true spatial multiplexing case of having more than one user per conventional channel, and the use of spatial processing with only one user per conventional channel. The term channel shall refer to a communications link between a base station and a single remote user, so that the term SDMA covers both a single channel per conventional channel, and more than one channel per conventional channel. The multiple channels within a conventional channel are called spatial channels. For a description of SDMA systems, see for example, co-owned U.S. Pat. Nos. 5,515,378 (issued May 7, 1996) and 5,642,353 (issued Jun. 24, 1997) entitled SPATIAL DIVISION MULTIPLE ACCESS WIRELESS COMMUNICATION SYSTEMS, Roy, III, et al., inventors, both incorporated herein by reference; co-owned U.S. Pat. No. 5,592,490 (issued Jan. 7, 1997) entitled SPECTRALLY EFFICIENT HIGH CAPACITY WIRELESS COMMUNICATION SYSTEMS, Barratt, et al., inventors, incorporated herein by reference; co-owned U.S. patent application Ser. No. 08/735,520 (filed Oct. 10, 1996), entitled SPECTRALLY EFFICIENT HIGH CAPACITY WIRELESS COMMUNICATION SYSTEMS WITH SPATIO-TEMPORAL PROCESSING, Ottersten, et al., inventors, incorporated herein by reference; and co-owned U.S. patent application Ser. No. 08/729,390 (filed Oct. 11, 1996) entitled METHOD AND APPARATUS FOR DECISION DIRECTED DEMODULATION USING ANTENNA ARRAYS AND SPATIAL PROCESSING, Barratt, et al., inventors, incorporated herein by reference. Systems that use antenna arrays to improve the efficiency of communications and/or to provide SDMA sometimes are called smart antenna systems. The above patents and patent applications are collectively referred to herein as "Our Smart Antenna Patents."

Because broadcasting implies the simultaneous transmission of data over a common channel to a dispersed set of subscriber units, it is desirable to find methods for using the multiple element antenna array and associated transmitter hardware for broadcasting both common downlink channel information and traffic information intended for one or more particular users.

Desirable Characteristics

A successful strategy will have the following characteristics:

given no prior information on the likely location of remote receivers, a remote receiver at any azimuth receiving a signal at least once over a time period at approximately the same level as a user at any other location at any time during the time period. This is called "near omnidirectional" (NOR) broadcasting herein;

low variation in the transmit power of each element in the array so that good advantage is taken of all elements in the array and scaling issues that arise in practice are minimized;

significant pattern gain relative to that achievable with a single element of the array transmitting at comparable power to the individual transmission powers of the array elements in the time period; and low total radiated energy so that all elements are being used efficiently.

The property "low relative radiated power" herein means low radiated power per antenna element over a time period relative to the power required to effect a comparable maximum radiation level (comparable in range, azimuth and elevation) using a single antenna element of the same gain (e.g., as measured in dBi) as the individual elements of the antenna array. Since the difference in radiated power may translate to different power amplifier requirements, and very high power amplifiers are relatively expensive, in some situations, even 1 dB may be a significant difference in radiated power. In more general cases, 3 dB will be considered a significant difference in radiated power.

Sectorized systems using antenna arrays are known in the art. In a sectorized system, rather than true omnidirectional broadcasting (360° of azimuth coverage) there is a need in the art for broadcasting efficiently in the intended coverage region (i.e., the sector) of the antenna array and associated electronics. Thus, in this document, the term "omnidirectional" will be taken in the following sense: 1) "omnidirectional" means approximately, nearly omnidirectional ("NOR"); 2) in an unsectorized cellular system, omnidirectional will mean NOR for 360° of azimuth coverage, and 3) in a sectorized system, omnidirectional will mean nearly omnidirectional in the intended sector width (e.g., 120° of azimuth coverage for 120° sectors).

The Prior Art

A common method for so broadcasting data is to use an omnidirectional antenna so that the RF carrier is transmitted more-or-less uniformly in all directions. This omnidirectional radiation pattern appears to be a reasonable choice for mobile cellular systems in which the subscriber units can be arbitrarily positioned within the cell area. In the case of a smart antenna system, one can achieve such an omnidirectional pattern either by using a separate single omnidirectional antenna (such as a vertical dipole) or one of the elements in the antenna array (assumed to have m elements). Unfortunately, this would require increasing the total transmitter power in that antenna element (or separate antenna) compared to the power levels used in ordinary TCH communications when all the antenna elements are operational, to achieve similar range for the traffic and control channels. The option of increasing power may not be allowed by regulation and, even if allowed, may not be a practical choice because, for example, power amplifier costs tend to increase rapidly with power.

The prior art method of transmitting from only a single array element would satisfy the desirable criteria of approximately constant gain as a function of azimuth and other quantities that describe the location of the remote receiver, and of low total radiated energy, but would not give low variation in the transmit power of each element in the array so that good advantage is taken of all elements in the array and scaling issues that arise in practice are minimized, and would not provide significant pattern gain relative to that achievable with a single element of the array transmitting at comparable power to the individual transmission powers of the array elements. In addition, transmitting from only one antenna would not enable simultaneous communications with several users on the same conventional channel.

Alternatively, the antenna array radiation pattern may be controlled through a combination of sending multiple beams and applying pre-processing to any signals prior to beamforming. U.S. Pat. No. 5,649,287, (issued Jul. 15, 1997), entitled ORTHOGONALIZING METHODS FOR ANTENNA PATTERN NULLFILLING, Forssen, et al., inventors, discloses a method for sending information in a cellular communication system comprising at least one base station with an antenna array and a plurality of mobile stations. The common information is pre-processed to create orthogonal signals. The orthogonal signals are then beamformed so that the orthogonal signals are delivered to the different beams in the array antenna. The orthogonal signals are transmitted and then received at one or more mobile stations. The signals are then processed at the mobile station to decipher the common information from the orthogonal signals. The orthogonalizing signals to be transmitted to the mobile stations are formed so as to prevent nulls from occurring in the antenna pattern.

The Forssen et al. method requires pre-processing (orthogonalizing) the control signal to form m orthogonal signals which are then fed to a beamformer. That is, any signal to be broadcast is first transformed to a set of uncorrelated signals, and then each of these signals is sent on a different beam. This requires extra hardware or processing steps. In addition, the particular embodiment described by Forssen et al. requires a high performance equalizer at the subscriber unit to resolve the orthogonalized signals from the other various lobes. It would be desirable to use a system in which any signal to be transmitted is weighted only in phase and amplitude without requiring an additional step (e.g., orthogonalization).

Thus there is a need in the art for methods for omnidirectional downlink transmitting that use the existing communications system apparatus including the existing antenna elements in an antenna array to achieve acceptable omnidirectional performance with low relative radiated power. There also is a need in the art for an apparatus that achieves this.

SUMMARY

One object of the invention is a method for downlink transmitting implemented on a communication station that includes an array of antenna elements to achieve acceptable omnidirectional performance with low relative radiated power, omnidirectional in the sense that a remote user located anywhere in azimuth within the range of the communication station can receive the message over a period of time. Another object is an apparatus that achieves this.

These and other objects are provided for in the various aspects of the disclosed invention.

One aspect of the invention disclosed herein is a method for transmitting a downlink signal with a desirable radiation pattern to subscriber units from a communication station which has an array of antenna elements. In the communication station, there are one or more signal processors programmed (in the case of programmable signal processors) to weight any downlink signal in phase and amplitude, the weighting describable as a complex valued weight vector. The weighted signals are fed to the inputs of transmit apparatuses whose outputs are coupled to the antenna elements. The method includes repeating transmitting the downlink signal a number of times, each transmission including (a) applying a signal processing procedure from a set of signal processing procedures to form a processed downlink antenna signal, the processing procedure including weighting the downlink signal in phase and amplitude according to a weight vector, and (b) transmitting the downlink signals by passing each processed downlink antenna signal to its intended antenna element through the intended antenna element's associated transmit apparatus. The set of processing procedures is designed so that any location in a desired sector achieves a desirable radiation level during at least one of the repetitions. Normally, the desired sector is a range of azimuths, for example, the whole range in azimuths of the sector of the array, and the desired radiation level is a non-null level. By a non-null level, we mean a significant energy level so that reception is possible. That is, every user in any location is transmitted to in the time period for all repetitions. Typically, the sequencing and each of the signal processing procedures are carried out by running a program in one of the signal processors.

In one embodiment of the method, each of the set of signal processing procedures comprises weighting with one of a sequence of different weight vectors. The method includes carrying out for each weight vector in the sequence of weight vectors the following steps: selecting a next weight vector from the sequence, weighting the downlink signal in phase and amplitude according to the selected weight vector to form a set of weighted downlink antenna signals, and transmitting the downlink signal by passing each weighted downlink antenna signal to its intended antenna element through the intended antenna element's associated transmit apparatus. The sequence is designed to achieve a desired radiation level in any location over a desired sector during at least one of the sequential transmissions using the weight vectors sequence. Normally, the desired sector is the whole range in azimuth, and the desired radiation level is a significant (i.e., non-null) level. That is, every user is transmitted to in the time period required to sequential transmit using all the weight vectors of the sequence. Typically, the sequencing logic is carried out by running a program in one of the signal processors. In one implementation, the weights of the sequence are pre-stored in a memory, and in another implementation, the weights are computed on the fly, possibly from one or more prototype weights, which are stored in a memory.

In the particular embodiments disclosed, the communication station operates using the PHS air interface protocol in a cellular system. One variant of the system is for low mobility applications, while another is for a wireless local loop (WLL) system. The invention, however, is not limited to any particular multiplexing scheme or air interface standards. Other embodiments may use any analog or digital multiplexing scheme (e.g., FDMA, TDMA/FDMA, CDMA, etc.) and/or any air interface standards (e.g., AMPS, GSM, PHS, etc.).

In one embodiment disclosed, the elements of the sequence of weight vectors all have the same amplitude and have random phase. In one implementation, the random phase is achieved on the fly by randomizing means (e.g., a random phase generator) which may be included in the transmit apparatuses. In another implementation, the sequence is pre-designed and pre-stored in a memory.

In another embodiment, the sequence is comprised of weight vectors that are orthogonal. The orthogonal weight vectors preferably (and not necessarily) have elements with the same magnitude. The description discloses three examples of orthogonal sequences that may be used: a sequence whose elements are the rows (or, equivalently, the columns) of a complex valued Walsh-Hadamard matrix, a sequence whose elements are the rows (or, equivalently, the columns) of a real valued Hadamard matrix, and a sequence whose elements are the basis vectors of the discrete Fourier transform (DFT or FFT).

In yet another embodiment, the sequence is comprised of weight vectors each of which is designed to provide a desirable radiation pattern (e.g., a near omnidirectional (NOR) pattern) within a sub-sector of the overall desired sector (typically the whole range in azimuth) with all the sub-sectors covering the overall desired sector so that sequentially broadcasting with each weight in the sequence covers the whole desired range. The weight vectors of the sequence are designed using the method described in the Parent Patent (U.S. patent application Ser. No. 08/988,519). In one embodiment, for example, the weight vectors of the sequence are each the weight vector that minimizes a cost function of possible weight vectors which includes an expression of the variation from the desirable radiation pattern of the radiation pattern within the particular sub-sector resulting from transmitting using the weight vector. In a particular version applicable for the antenna array having elements which are substantially uniformly distributed, a prototype weight vector for one sub-sector is designed, and the other weight vectors of the sequence are "shifted" versions of the prototype obtained by shifting the prototype weight vector by an amount determined by the angular shift of the sub-sector from the prototype weight vector sub-sector. See the Parent Patent for details.

In another aspect of the invention, the sequence of weight vectors includes weight vectors that are representative of the weight vectors designed for transmission to the known subscriber units for the communication station. Typically, the weight vectors designed for transmission to the known subscriber units are determined from the transmit spatial signatures of the known subscriber units. In one embodiment, the representative weight vectors are the weight vectors designed for transmission to the known subscriber units. In another embodiment, the representative weight vectors are fewer in number than the weight vectors designed for transmission to the known subscriber units, and are determined from the subscriber units weight vector using a vector quantization clustering method. Many clustering methods are known in the art and any may be used for this part of the invention. The preferred embodiment clustering method starts with a set of weight vectors (e.g., the weight vectors designed for transmission to the known subscriber units) and iteratively determines a smaller set of weight vectors representative of the a set of weight vectors. At first, an initial set of representative weight vectors is assigned. During each iteration, each weight vector is combined with its nearest representative weight vector, nearest according to some association criterion. An average measure of the distance between each representative weight vector and all the weight vectors combined with that representative weight vector is determined. Preferably, the average measure is the average square of the distance. Until the magnitude of the difference between this average measure in the present iteration and this average distance in the previous iteration is less than some threshold, each representative weight vector is replaced with a core weight vector for all the weight vectors that have been combined with the representative weight vector during that iteration, and the combining and threshold checking step is repeated. The core weight vector preferably is the geometric centroid of all the weight vectors that have been combined with the representative weight vector during that iteration. When the average measure between each representative weight vector and all the weight vectors combined with that representative weight vector is less than some threshold, the representative weight vectors achieving this are the final representative weight vectors used as the representative weight vectors for sequential transmission of the downlink signal.

In one embodiment of this clustering method, the association criterion used for nearness is the nearest Euclidean distance and the core weight vector is the geometric centroid of all the weight vectors that have been combined with the representative weight vector during that iteration. In another embodiment, the association criterion used for nearness is the maximal cosine angle, in which case the core weight vector that each representative weight vector is replaced is the principal singular vector obtained from carrying out the singular value decomposition on all the weight vectors that have been combined with the representative weight vector during that iteration. In addition, in one embodiment of the clustering method, the initial representative weight vectors are the unit amplitude weight vectors aimed at different uniformly spaced angles in the angular region of interest (preferably 360 degrees in azimuth). Other initial values also may be used. For example, in another embodiment applicable for the case of the number of representative weight vectors being equal to the number of antenna elements, one may use the Walsh-Hadamard orthogonal weights as the initial set of representative weight vectors. Alternatively, one may use DFT orthogonal weights as the initial set of representative weight vectors.

In an alternate improved embodiment, the sequence of weight vectors includes two sub-sequences, the first sub-sequence comprising weight vectors which are representative of the transmit weight vectors for the existing subscriber units, and the second sub-sequence including a weight vector designed for near omnidirectional broadcasting. The weight vector designed for near omnidirectional broadcasting may be so designed according an implementation of the method of the Parent Patent. Alternatively, the second sub-sequence may be a set of orthogonal weight vectors.

BRIEF DESCRIPTION OF THE DRAWINGS

The present invention will be more fully understood from the detailed preferred embodiments of the invention, which, however, should not be taken to limit the invention to any specific embodiment but are for explanation and better understanding only. The embodiments in turn are explained with the aid of the following figures.

DETAILED DESCRIPTION OF THE PREFERRED EMBODIMENTS

The invention preferably is implemented in the base station part of a wireless communication system with SDMA, in particular a cellular SDMA system. In one implementation, the system operates using the PHS communications protocol which is suitable for low mobility applications. The subscriber units may be mobile. Abovementioned and incorporated-herein-by-reference co-owned U.S. patent application Ser. No. 08/729,390 describes the hardware of a base station of such a system in detail, the base station preferably having four antenna elements. In a second implementation, the subscriber units have fixed location. The PHS communications protocol again is used. Wireless systems with fixed locations are sometimes called wireless local loop (WLL) systems. A WLL base station into which some aspects of the present invention are incorporated is described in co-owned U.S. patent application Ser. No. 09/020,049 (filed Feb. 6, 1998) entitled POWER CONTROL WITH SIGNAL QUALITY ESTIMATION FOR SMART ANTENNA COMMUNICATION SYSTEMS, Yun, Inventor, incorporated-herein-by-reference (hereinafter "Our Power Control Patent"). Such a WLL base station may have any number of antenna elements, and many of the simulations described herein will assume a 12-antenna array. It will be clear to those or ordinary skill in the art that the invention may be implemented in any SDMA system with one or more than one spatial channel(s) per conventional channel, and having mobile, fixed, or a combination of mobile and fixed subscriber units. Such a system may be analog or digital, and may use frequency division multiple access (FDMA), code division multiple access (CDMA), or time division multiple access (TDMA) techniques, the latter usually in combination with FDMA (TDMA/FDMA).

Figure 1:
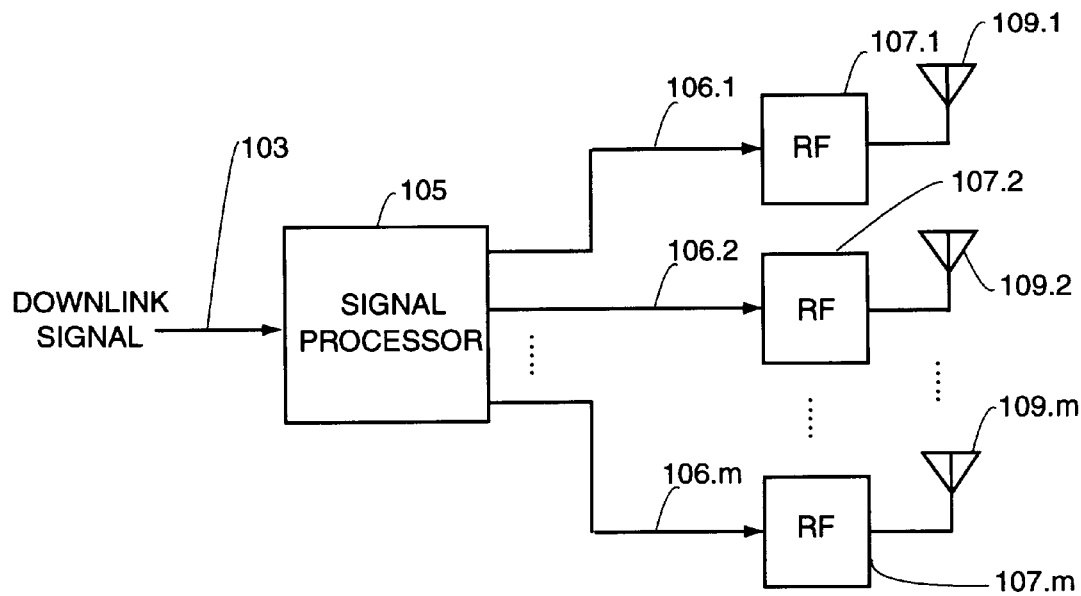
FIG. 1 shows the transmit processing part and the transmit RF part of a base station on which the present invention may be embodied.

FIG. 1 shows the transmit processing part and the transmit RF part of a base station (BS) on which the present invention may be embodied. Digital downlink signal 103 is to be broadcast by the base station, and typically is generated in the base station. Signal 103 is processed by a signal processor 105 which processes downlink signal 103, the processing including spatial processing comprised of weighting downlink signal 103 in phase and amplitude into a set of weighted downlink antenna signals, the weighting describable by a complex valued weight vector. Signal processor 105 may include a programmable processor in the form of one or more digital signal processor devices (DSPs) or one or more general purpose microprocessors (MPUs) or both one or more MPUs and one or more DSPs together with all the necessary memory and logic to operate. The reader is referred to above-mentioned co-owned U.S. patent application Ser. Nos. 08/729,390 and 09/020,049 for details. In the preferred embodiments, the spatial processing (spatial multiplexing) and the methods of the present invention are implemented in the form of programming instructions in signal processor 105 that when loaded into memory and executed in the DSP(s) or MPU(s) or both cause the apparatus of FIG. 1 to carry out the methods. Thus signal processor 105 has the same number of outputs, that number denoted by m herein, as there are antenna elements in the transmitting antenna array of the base station. The outputs are shown as 106.1, 106.2, . . . , 106.m in FIG. 1. In the preferred embodiment, the same antenna array is used for transmitting and for receiving with time domain duplexing (TDD) effected by a transmit/receive switch. Since the invention mainly is concerned with transmitting, duplexing functionality is not shown in FIG. 1. FIG. 1 thus would apply also for a base station that only transmits, for a base station with different antennas for transmission and reception, and for a base station that uses frequency domain duplexing (FDD) with the same transmit and receive antennas. The m outputs of signal processor 105, typically but not necessarily in baseband, are upconverted to the required RF frequency, then RF amplified and fed to each of the m antenna elements 109.1, 109.2, . . . , 109.m. In the WLL and mobile systems on which the invention is implemented, some of the upconversion is carried out digitally, and some in analog. Since upconversion and RF amplification is well known in the art, both are shown combined in FIG. 1 as RF units 107.1, 107.2, . . . , 107.m.

GENERAL DESCRIPTION OF THE METHODS

The common aspect of the method and apparatus of the present invention is to transmit the downlink signal a number of times, say n times, each time with different signal processing, the signal processing including weighting with a transmit weight vector, and chosen so that over the time to transmit with all the n different signal processing procedures, any location in a desired sector achieves a desirable radiation level during at least one of the transmissions. Normally, the desired sector is a range of azimuths, for example, the whole range in azimuths of the sector of the array, and the desired radiation level is a significant (i.e., non-null level). Preferably, given no other information, a remote user in any azimuth in the desired sector sees the same maximum radiation level when the same distance from the transmitter over the time to transmit with all the n different signal processing procedures. Usually the desired sector is 360° for a non-sectored system and the sector of the antenna array in a sectored system.

In one illustrative embodiment of the method of the present invention, the n instances of the signal processing each include weighting by a corresponding weight vector of a sequence of n transmit weight vectors. Thus, in this embodiment, the downlink signal is transmitted a number of times, say n times, each time with a different weight vector from a sequence of n different weight vectors, the n weight vectors chosen so that over the time to transmit with all the n weight vectors, any location in a desired sector (e.g., the sector of the array) achieves a desired radiation level during at least one of the transmissions. Normally, the desired sector is a range of azimuths, for example, the whole range in azimuths of the sector of the array, and the desired radiation level is a significant (ie., non-null) level. Preferably, given no other information, a remote user in any azimuth in the desired sector sees the same maximum radiation level when the same distance from the transmitter over the time to transmit with all the n weight vectors. Usually the desired sector is 360° for a non-sectored system and the sector of the antenna array in a sectored system. While a different weight vector effectively is used in each repetition, such a difference may be achieved, for example, either by selecting a different weight vector, or using a single weight vector with additional means for modifying the weight vector to produce a different effective weight vector.

Figure 2:
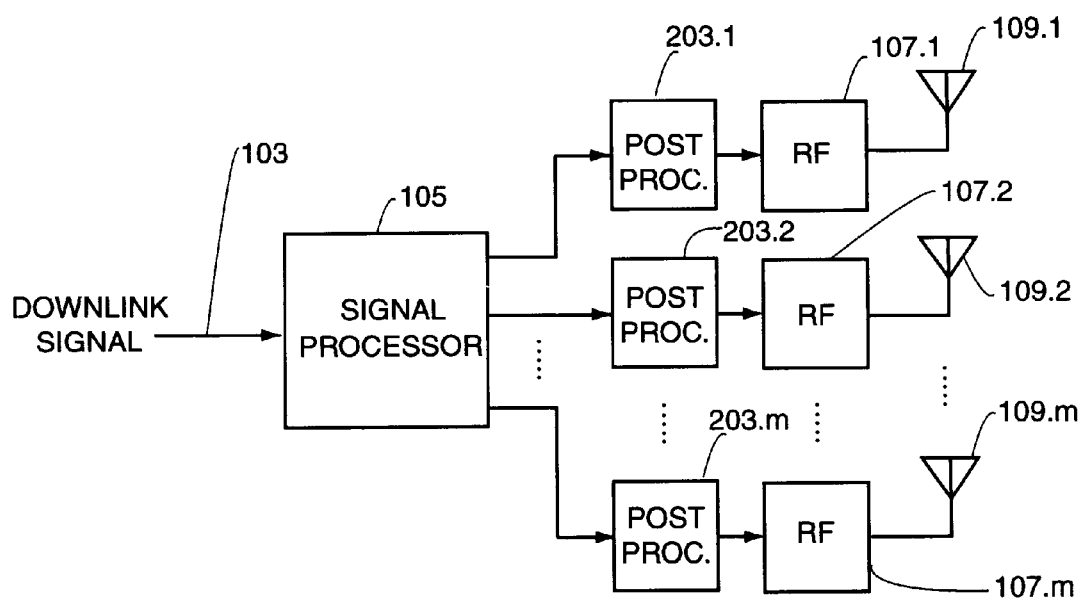
FIG. 2 shows the transmit processing part and the transmit RF part of a base station with post-processing means in the transmit path for each antenna element.

In another implementation, the signal processing procedure includes post-processing after the spatial processing, for example, using analog or digital filtering in baseband, or analog filtering in the RF domain, the spatial processing typically but not necessarily using essentially the same transmit weight vector for each repetition. In each of the n instances of transmitting the downlink signal, the downlink signal is spatially processed to a plurality of signals, one for each antenna element. Each of the antenna signals is post-processed in a different way. Note that each of the antenna signals is upconverted to RF, usually with one or more stages of intermediate frequency (IF) amplification, and the processing may be done before such up-conversion, using digital or analog means, or after digital upconversion (when there is digital upconvension) using digital or analog means, or after analog upconversion using analog means. In the analog implementation, different analog filtering is introduced in each of the m antenna signals, and in each of the n instances in RF units 107.1, 107.2, . . . , 107.m feeding the m antenna elements 109.1, 109.2, . . . , 109.m. This may be done, for example, by introducing a different amount of time delay in each of the m antenna signals, and in each of the n instances. FIG. 2 shows post-processing means 203.1, 203.2, . . . , 203.m which, for example, are each time delay apparatuses which produce m different time delays. For each RF unit, the post-processing means is seen at the input. However, it would be clear to those in the art that the post-processing might occur within the RF unit, and not only in baseband. When such time delays are introduced, appropriate equalizers may be needed by receiving subscriber units, as would be clear to those of ordinary skill in the art. The post processing may be done also, for example, by introducing a different amount of frequency offset in each of the m antenna signals, and in each of the n instances. FIG. 2 shows post-processing means 203.1, 203.2, . . . , 203.m which in this case are each frequency offset apparatuses which produce m different frequency offsets. The amounts of different frequency offset or different time delay to introduce in each of the m antenna signals would be insufficient to cause problems for the demodulators at the subscriber units but sufficient to orthogonalize the m antenna signals. A particular frequency-offset introducing post processing embodiment may be used in systems that use programmable upconverter/filters in the RF transmit apparatuses. Such a device is the Graychip, Inc. (Palo Alto, Calif.) GC4114 quad digital upconverter/filter device which is used in the implementation of RF systems 107.1, 107.2, . . . , 107.m in the base station of the WLL system described in Our Power Control Patent, (above-mentioned U.S. patent application Ser. No. 09/020,049). The GC4114 has phase offset (and gain) registers which may be used to introduce frequency offset into the signal.

It should be mentioned that the frequency offset post-processing method can be thought of as transmitting with a transmit weight vector whose phase changes during the transmission time of each repetition. For example, with digital modulation such as used in the preferred embodiment, introducing a small frequency offset effectively causes the constellation space to slowly rotate. The constellation space is the complex constellation swept out by a complex valued (in-phase component I and quadrature component Q) baseband signal. Thus, using the frequency offset post-processing embodiment may cause different symbols of the downlink signal burst to be transmitted with a different radiation pattern. Thus some averaging of the pattern occurs during each repetition, and it may be possible to use fewer repetitions.

Another way of introducing post-processing to produce a set of orthogonalized processed downlink signals to sequentially transmit is to use only one weight vector, and uses RF systems 107.1, 107.2, . . . , 107.m that each include means for randomizing the phase. The m phases during each transmission are then random with respect to each other. FIG. 2 shows post-processing means 203.1, 203.2, . . . , 203.m which in this case are each phase randomizing means, included in RF systems 107.1, 107.2, . . . , 107.m. For each RF unit, the phase randomizing means is seen at the input. However, it would be clear to those in the art that the randomizing might occur within the RF unit, and not only in baseband. In one embodiment, randomizing means 203 includes sequentially addressing sine and cosine lookup tables with random initial indexes. Another embodiment may be used in systems that use programmable upconverter/filters in the RF transmit apparatuses. For example, in the above-mentioned embodiment which uses the Graychip, Inc. GC4114, which has phase offset (and gain) registers, these may be used to change the phase (and amplitude) of the signal. The phase change happens at the digital IF.

A first illustrative apparatus embodying the invention includes sequencing logic for sequencing through a sequence of n different weight vectors. In the preferred embodiment, the sequencing logic is a set of programming instructions in signal processor 105 (which may consist of one or more DSP devices). The sequencing means also includes, in one embodiment, storage for storing the sequence of weight vectors, and in another embodiment, generating means for generating the weight vectors of the sequence of weight vectors on the fly, together with storage means for storing one or more prototype weight vectors from which the sequence is generated using the generating means. How to implement such sequencing logic using DSP devices and/or microprocessors would be clear to one of ordinary skill in the art.

A second illustrative apparatus embodying the invention includes sequencing logic for sequencing through a set of n signal processing procedures. In the preferred embodiment, the sequencing logic and the signal processing procedures are each a set of programming instructions in signal processor 105 (which may consist of one ore more DSP devices). The signal processing procedures may be any of the sets of post-processing procedures described above for processing the spatially processed downlink signal into one of a set of orthogonal processed downlink signals together with appropriate spatial processing. How to implement such sequencing logic and signal processing using DSP devices and/or microprocessors would be clear to one of ordinary skill in the art.

The PHS protocol used in the preferred embodiment allows one to define the control channel interval (the amount of time between control bursts, in frames). For example, in many PHS systems, the control burst is sent every 20 frames. Since a frame is 5 ms in standard PHS, this means the BCCH is sent every 100 ms. In PHS as used in the WLL system incorporating the preferred embodiment, the control burst is sent every 5 frames (25 ms). Therefore, if the sequence has 12 weights, then the complete sequence is repeated every 300 ms.

Random Phase Weights

In a first embodiment of using a sequence of weight vectors, the set of weight vectors consists of weights of elements having the same amplitude with randomly varying phase. Several ways are possible for implementing this.

One way of achieving such random phase is to pre-choose and pre-store a set of weight vectors having the equal amplitude elements, but with random phases, and sequence through the set of weight vectors.

A second way of achieving random phase is to have one prototype weight vector, and to repeat transmission with the same weight vector modified on the fly to randomize the phase. Mathematically, denoting the prototype transmit weight vector by w with elements $w_1, \ldots, w_m$, the method includes repeating transmitting the downlink signal with a weight vector of elements $w_1 \exp(j\phi_1), \ldots, w_m \exp(j\phi_m)$, where in each repetition, the $\phi_1, \ldots, \phi_m$ are varied randomly. That is, each of the quantities $\phi_1, \ldots, \phi_m$ is a random quantity uniformly distributed between 0 and $2\pi$.

Experiments were performed with the random phase strategy and it was observed that the statistics of the signal received by a stationary user approximately followed a Raleigh distribution. A moving user receiving a signal from a base station transmitting with a single antenna would see such a distribution, for example. Therefore, standard communication protocols and air interface standards are particularly tolerant of signals that have Raleigh distributions.

Orthogonal Weights

A second embodiment uses a set of orthogonal weight vectors for the sequence of weight vectors. In the preferred embodiment, the number of orthogonal vectors to sequence through is equal to m, the number of antenna elements in antenna array 109. Denote by $w_i$, i=1, ..., m, the ith (complex valued) transmit weight vector in the sequence. That is, for the duration of transmitting with the ith weight vector, the modulated signal to be broadcast is weighted (in baseband) in amplitude and phase to each antenna element according to the value of the corresponding complex valued element of weight vector $w_1$. Let s(t) denote the downlink signal to be broadcast, where t is time (either an integer index for digital systems, or time in an analog system, as would be understood by those of ordinary skill in the art). Let fn represent the necessary transmit modulation for the particular transmit system. For the PHS standard used in the preferred embodiments, fn is differential quartenary phase key modulation (DQPSK). Then, denoting $$w_i = [w_{i1} \ldots w_{im}],$$

the signal (e.g., in baseband), denoted $y_{ij}(t)$, to be transmitted by the jth antenna element (of a total of m antenna array elements) with the ith weight may be mathematically described as $$y_{ij}(t) = w_{ij} * fn(s(t)),$$

where ( )* indicates the complex conjugate.

A convenient way to specify all m weight vectors of the sequence is to stack up each of the $w_i$, i=1, ..., m to form a m by m matrix denoted W, so that $$W = \begin{bmatrix} w_1 \\ w_2 \\ \vdots \\ w_m \end{bmatrix}.$$

Specifying W specifies the whole sequence. W sometimes is referred to as the basis matrix herein.

In the preferred embodiment, since it is desired to use all antenna elements, each (complex-valued) element of each weight vector in the sequence is forced to have the same magnitude. That is, all antennas transmit all the time (during the broadcast) with the same power. Mathematically, this can be expressed as $|w_{ij}|=1$ for all i and for all j. The actual magnitude is determined by the power control part of the base station. See for example, Our Power Control Patent (above-mentioned U.S. patent application Ser. No. 09/020, 049).

Walsh-Hadamard Coefficients

In one embodiment, the weight vectors are the rows (or columns) of W, where W is a generalized (i.e., complex valued) Walsh-Hadamard matrix. The following MATLAB computer code (The Mathworks, Inc., Natick, Mass.), generates Walsh-Hadamard matrices for the cases of m=2, 4 and 8.

```
%
% generating an orthogonal set of weights using a complex
% version of the Walsh-Hadamard matrix.
% the weight vectors can either be the row or column vectors
% of the basis matrix W.

m = 4;     % m is the number of antennas pos = [ 1+sqrt(-1) 1-sqrt(-1)]/sqrt(2);
neg = [-1-sqrt(-1) 1-sqrt(-1)]/sqrt(2);

a2 = [pos; neg];
a4 = [a2 a2; a2 -a2];
a8 = [a4 a4; a4 -a4];

if (m == 2)
   basis = a2;
elseif (m == 4)
   basis = a4;
elseif (m == 8)
   basis = a8;
end;
```

In another embodiment, the weight vectors are the rows (or columns) of m-dimensional matrix W, where W is a real-valued Hadamard matrix with +1 and −1 coefficient values.

DFT Coefficients

In another embodiment, the weight vectors are the basis vectors of the m-point discrete Fourier transform (DFT) and its fast implementation, the fast Fourier transform (FFT). These are the rows (or columns) of W, where, with $j^2=-1$, $$W = \begin{bmatrix} 1 & 1 & \cdots & 1 \\ 1 & e^{\frac{j2\pi}{m}} & \cdots & e^{\frac{j2\pi(m-1)}{m}} \\ \cdots & \cdots & \cdots & \cdots \\ 1 & e^{\frac{j2\pi(m-1)}{m}} & \cdots & e^{\frac{j2\pi(m-1)^2}{m}} \end{bmatrix}.$$

Methods Based on Weights with Desirable Patterns

The Parent Patent describes defining a cost function (of weight vector(s)) that defines the desirable aspects of the weight vectors in terms of the overall radiation pattern, power distribution amongst the antenna elements, etc. Similarly, in another embodiment, a cost function of a sequence of weight vectors is defined to achieve a desirable overall pattern and a desirable variation in power amongst the various elements of the transmitting antenna array.

One aspect of this is to split the design problem into a number of designs of weight vectors, the weight vectors forming the sequence of weight vectors. Each weight vector designed (for example using the methods described in the Parent Patent) for having a desirable radiation pattern over a sub-sector, the union of all the sub-sectors defining the desired region of coverage and the superposition of all the sub-sectors defining the overall desired pattern over the region of coverage. When the sequencing is in a particular order, this is equivalent to "sweeping" a region with a sub-sector, although there is no requirement to sequence in a particular order that simulates sweeping. When an approximately uniform antenna array is used, a single "prototype" weight vector for achieving a near omnidirectional pattern over a single sector (say of width $\Delta\theta$) is designed, and this weight vector is "shifted" by an amount defined by $\Delta\theta$, the size of the overall desired region, and the number of weight vectors in the sequence. For example, with an approximately uniform linear array for coverage over 180° with m sequential transmissions, the shift is 180°/m and $\Delta\theta$ is preferably slightly larger than 180°/m.

Another aspect is the more general design of a sequence of weight vectors that achieves the desired property directly, as defined by a cost function to be minimized. How to design such a cost function would be clear to one of ordinary skill in the art from this description and that of the Parent Patent.

Methods Based on Knowledge of Remote Users

In a WLL system, subscriber unit locations are fixed and known (in the form of transmit spatial signatures) by the base station. One broadcast strategy is based on sequentially transmitting the broadcast message to each subscriber by using a weight vector determined from the subscriber's known transmit spatial signature with possibly some other criteria. Using a transmit weight vector determined only from the subscriber's spatial signature may ensure that maximum power is delivered to that user. An additional criterion to add may be minimizing energy to other users.

For local subscriber loops with a large number of SUs, sequentially transmitting to all SUs may require too much time for each broadcast message. The amount of time required may be reduced by providing a set of sectorized radiation patterns (see above) that may be sequenced, in which each sectorized radiation pattern can cover more than one subscriber. Another option is to determine a smaller set of broadcast transmit weight vectors that adequately "represent" the set of weight vectors for each of the SUs. One example of this is vector quantization (VQ). See Gray, R. M., "Vector Quantization," IEEE ASSP Magazine, Vol. 1, No. 2, April 1984 (ISSN-0740-7467) for an introduction to VQ. VQ methods have been applied to other technical fields, such as to image compression, linear predictive coding of voice feature vectors for speech coding and voice recognition, etc.

Let there be p remote users, the kth user having a transmit spatial signature $\alpha_{tk}$, k=1, . . . , p. Let $w_k$ be the weight vector "aimed" at the kth user. That is, if we express the spatial signatures in the form $$a_{tk} = \begin{bmatrix} \alpha_{k1} e^{j\phi_{k1}} \\ \alpha_{k2} e^{j\phi_{k2}} \\ \vdots \\ \alpha_{km} e^{j\phi_{km}} \end{bmatrix},$$

where the $\alpha_{ki}$ are positive amplitudes, and the $\phi_{ki}$ are angles, then the "optimal" weight vectors "aimed" at the p users are $$w_k = \begin{bmatrix} e^{-j\phi_{k1}} \\ e^{-j\phi_{k2}} \\ \vdots \\ e^{-j\phi_{km}} \end{bmatrix}, k = 1, \ldots, p.$$

Many methods are known for selecting the set of n representative m-vectors of a larger set of p m-vectors. Amongst these are what generally are known as "clustering" methods in the literature. In our application, one starts with p weight vectors (for example, the p weight vectors aimed at the p known remote users), and determines from these the n weight vectors (code vectors) that are representative of the p weight vectors. The particular clustering method used is now described. Note that while p is preferably the number of remote users, the method is general; there may be more initial weight vectors than known remote users (see later). The method we use proceeds iteratively as follows:

1. Start with p weight vectors (these are denoted $w_1$, i=1, . . . , p), and preferably p is the number of remote users and the $w_i$ are the optimal weight vectors aimed at the p remote users, and start with the n initial code vectors (denoted $v_k$, k=1, . . . , n). Preferably, the initial code vectors are the unit amplitude weight vectors aimed at n uniformly spaced angles in the angular region of interest (preferably 360 degrees in azimuth).

2. For each of the weight vectors, (i.e., for each i=1, . . . , p), find k such that $\|w_i - v_k\| \le \|w_i - v_l\|$ for all l=1, . . . , n. This finds for each weight vector $w_1$, the nearest neighbor code vector $v_k$ ("nearest" in Euclidean distance $\| \ldots \|$). The criterion used here is called the "association" criterion, so the association criterion preferably is the nearest Euclidean distance.

3. Combine (associate) each such weight vector $w_i$ with its the nearest neighbor code vector $v_k$. Denote the number of weight vectors that are combined with the code vector $v_k$ by $n_k$ and denote as $w_{i,k}$ the weight vectors $w_i$ that have been combined with code vector $v_k$.

4. Calculate the average squared Euclidean distance between the weight vectors and the code vectors they are combined with. That is, calculate $$d^2 = \frac{1}{p} \sum_{k=1}^{n} \sum_{i=1}^{n_k} \|w_{i,k} - v_k\|^2$$

and determine if the magnitude of the difference between $d^2$ for this iteration and the value of $d^2$ for the previous iteration is less than some small threshold $\delta d^2$. If yes, stop. In one embodiment, $\delta d^2$ is $10^{12}$ when all weight vectors are normalized to 1. Note that step 4 need not be carried out in the first iteration.

5. If this is the first iteration or if the magnitude of the difference in $d^2$ between the current and the previous iteration is not less than the threshold $\delta d^2$, replace each code vector $v_k$, k=1, . . . , n, by the geometric centroid (in m-dimensional complex space) of the $n_k$ weight vectors $w_{i,k}$ that have been combined with that code vector $v_k$. That is, replace each $v_k$ with $$v_{k,new} = \frac{1}{n_k} \sum_{i=1}^{n_k} w_{i,k}.$$

6. Go back to step 2.

Thus one determines n vectors representative of the p weight vectors, these p vectors preferably being the weight vectors optimal for the known remote users.

In an alternate implementation, the association criterion in determining neighbors step 2 and in combining step 3 is to combine each weight vector $w_i$ with its maximal cosine angle code vector $v_k$ rather than with its nearest neighbor code vector. The cosine of the angle between two vectors is the dot product of the normalized vectors:

$$\cos\theta_{i,k} = \frac{|w_i \cdot v_k|}{\|w_i\| \cdot \|v_k\|},$$

where • is the dot product. Step 5 of replacing each code vector in this case is modified to: carrying out a singular value decomposition (SVD) on the matrix whose column are the $n_k$ weight vectors $w_{i,k}$ that have been combined with code vector $v_k$, and replacing each code vector $v_k$, k=1, . . . , n, by the principal singular vector obtained from carrying out the SVD on the $n_k$ weight vectors $w_{i,k}$ that have been combined with code vector $v_k$.

Other initial values also may be used. For example, in yet another alternate implementation, applicable for the case of the number of code vectors n being equal to the number of antenna elements m, one may use the Walsh-Hadamard orthogonal weights as the initial set of code vectors. Alternatively, one may use DFT orthogonal weights as the initial set of code vectors. Alternatively, one may use a set of random initial code vectors.

Figure 3A:
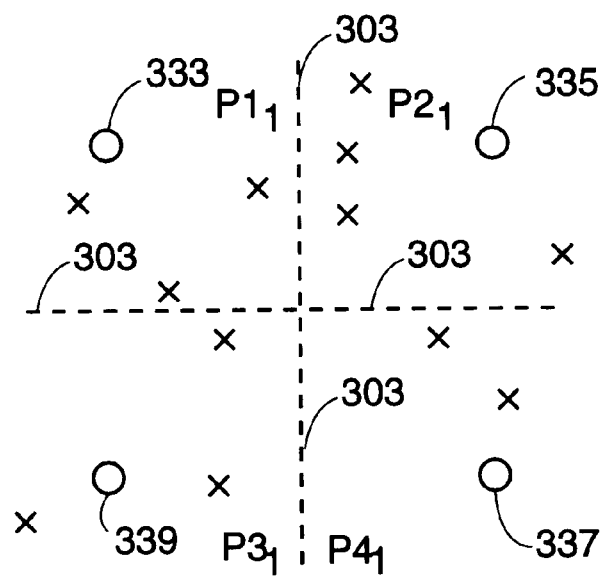
FIGS. 3(a) and 3(b) show, in a simplified manner, the preferred embodiment clustering method at two different stages (iterations) of one method of selecting vector quantization code vectors from a set of weight vectors.
Figure 3B:
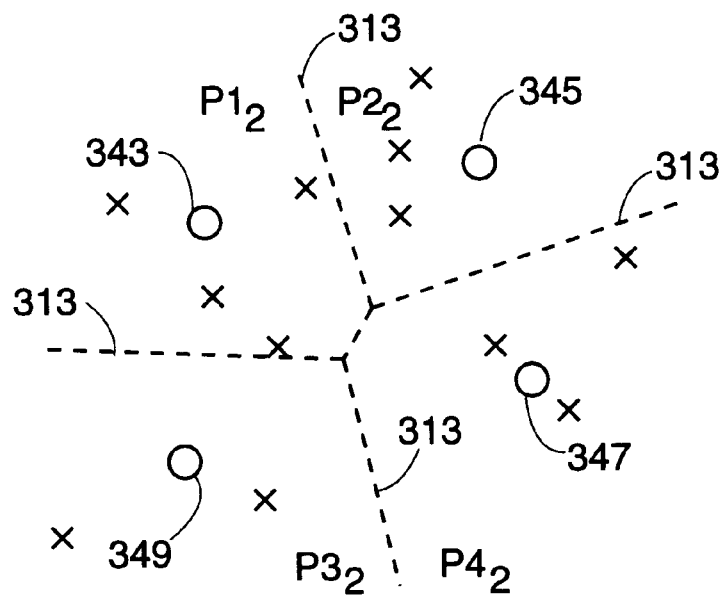

An example of using the method of selecting the code vectors using the preferred method is shown in FIGS. 3(a) and 3(b) in two dimensions for visual simplicity. In practice, of course, the vectors are complex values and in m dimensions. In the case shown, there are twelve original weight vectors and from these, four (the number n) code vectors are generated. FIGS. 3(a) and 3(b) show the state of the method at two different stages (iterations) of the preferred code vector generation method. The four code vectors are shown as circles, and are numbered 333, 335, 337, and 339 in FIG. 3(a) and 343, 345, 347, and 349 in FIG. 3(b), respectively. The twelve original weights are shown as Xs in both figures. Some initial set of code vectors is assigned initially, and these are code vectors 333, 335, 337, and 339 of FIG. 3(a). During each iteration, each weight vector is combined with its nearest code vector, splitting space into four regions. The boundaries of the regions are shown as dotted lines 303 in FIG. 3(a) and dotted lines 313 in FIG. 3(b), and the regions are shown labeled P1$_1$–P4$_1$ and P1$_2$–P4$_2$ in FIGS. 3(a) and 3(b) respectively. The code vectors in any stage, e.g., code vectors 343, 345, 347, and 349 in FIG. 3(b), are the centroids of the weight vectors of each former region. Thus, code vector 345 in FIG. 3(b) is the centroid of the four weight vectors in region P2$_1$ in FIG. 3(a). Replacing the code vectors by the centroids, the average Euclidean distance between code vectors and original weight vectors would decrease. The preferred embodiment method stops when the difference between the average Euclidean distance at the present stage (iteration) i and the previous iteration is smaller than some predefined threshold. The n weight vectors used for sequencing are the code vectors of the last iteration.

An alternative method for determining the n code vectors to use as the sequence of weight vectors with which to sequentially transmit the downlink methods from an initial set of p weight vectors is based on using the singular value decomposition (SVD). The SVD method applied to the code vector selection process proceeds recursively as follows:

1. Perform the singular value decomposition on the matrix $[w_1 \ldots w_p]$ whose columns are the p weight vectors. As before, preferably p is the number of remote users and the $w_i$ are the optimal weight vectors aimed at the p remote users. Consider the principal singular vector, denoted by x.

2. For each of the p weight vectors $w_1, \ldots w_p$, determine the cosine of the angle between the weight vector and the principal singular vector, that is, determine $$\cos\theta_{i,x} = \frac{|w_i \cdot x|}{\|w_i\| \cdot \|x\|}, \text{ for } i = 1, \ldots, p.$$

3. Split the set of weight vectors into two sets. If the cosine of the angle between a weight vector and the principal singular vector is smaller than some threshold, that weight vector is selected for the first set. Otherwise, that weight vector is assigned to the second set.

4. Repeat the above steps 1, 2 and 3 for the second set to split it up into two sets, continuing this recursion step 4 until the number of sets n is obtained, and the code vectors are then the n principal singular vectors from the recursions.

Other methods for determining the n code vectors to use as the sequence of weight vectors with which to sequentially transmit the downlink methods also may be used without deviating from the scope. See for example the above-mentioned article by R. M. Gray. See also, for example, the binary split method of Rabiner, L. R., et al., "Note on the properties of a Vector Quantizer for LPC Coefficients", *Bell Systems Technical Journal,* Vol. 62, No. 8, October 1983, pp. 2603–2616. This and other methods of "clustering" known in the art may be adapted to the common channel broadcast problem, and how to so adapt a clustering method would be clear to those of ordinary skill in the art.

While the above discussion assumes p remote users and p initial weight vectors, there also may be more than one weight vector per remote user, so that p may be larger than the number of known remote users. For example, in a typical system, some of the remote users' spatial signatures may change significantly over time, while others do not. Thus, in an alternate embodiment of the VQ method (applicable to all alternative VQ implementations), the original weight vectors from which to determine the representative set of n weight vectors include a record over time of the weight vectors of users. In another alternate embodiment, a statistical record of remote user weight vectors is used.

To implement this in the WLL system for which some of the alternate embodiments of the invention are candidates, typically 6 or 7 spatial signatures may be stored for each remote user. In addition, the short-term (over one call) and long-term (over several calls) variance of the spatial signatures may be stored.

In these embodiments, the generation of the n code vectors to use for the sequential broadcasting method of the invention is carried out periodically as the user base is known to change. This generation may be carried out off-line, or may be carried out within the base station in signal processor 105.

Alternatively, p may be less than the number of known remote users. For example, one of the p weight vectors may be sufficient to cover more than one remote user.

Methods Based on Partial Knowledge

While in general in a WLL system, the spatial signatures of the existing remote users are known, there may be some new users in the system whose signatures are not yet known. In an improved embodiment, the message is sequentially transmitted with each weight vector of a first set of n weight vectors which are representative of the existing remote users, and then the message is broadcast again with an additional weight vector from a second set of some other number, say $n_1$, of weight vectors designed for (near) omnidirectional broadcasting, e.g., weight vectors which are either orthogonal, or are randomized (e.g., random phase) as described herein above. Sequential transmissions with the n representative weight vectors are now repeated before transmission with the next weight of the second set of weight vectors. In this way, the downlink message will eventually be received by even an unknown remote user, this typically taking longer than to be received by a known remote user.

In an alternate improved embodiment, the message is sequentially transmitted with each weight vector of a first set of n weight vectors which are representative of the existing remote users, and then the message is broadcast with an additional weight vector designed for near omnidirectional broadcast, for example using any of the embodiments described in the Parent Patent.

In the case of a cellular system serving mobile subscriber units, it is not possible to assign fixed transmit weight vectors because location varies with time. However, a set of preferred locations may develop because of subscriber "attractor" locations, such as airports or other transportation centers, that tend to be temporary locations for a significant fraction of the subscriber mobile stations within the coverage area at any give time.

If a particular base station serves both stationary and mobile subscribers, a combination strategy can be used to serve both types of subscribers by sequencing through a codebook set of VQ weight vectors representative of the weight vectors for the users with known spatial signatures, and then by sequencing through an appropriate set of random phase or of orthogonal weight vectors designed for near omnidirectional broadcasting. Also, attractor locations that tend to have a large number of mobile clients, such as transportation centers, having known associated transmit weight vectors can be included together with the stationary subscriber units in the VQ process, or accessed in addition to other antenna radiation pattern sequencing. Sectors with different concentrations of subscriber units can be treated differently, e.g., generating multiple VQ codebooks for broadcasting to different sectors separately or in combination with other sequencing strategies.

Simulation Results

Some of the methods described hereunder were evaluated by simulation. In the simulation, the "optimal" weight vectors to use are known, where "optimal" is defined below. The transmit spatial signature characterizes how a remote terminal receives signals from each of the antenna array elements at the base station over a particular conventional channel. In one embodiment, it is a complex valued column vector, denoted $\alpha_t$ herein, containing relative amounts (amplitude and phase with respect to some fixed reference) of each of the antenna element transmitter outputs that are contained in the output of the receiver at the remote terminal. For an m-element array, $$\alpha_t = [\alpha_{t1} \alpha_{t2} \ldots \alpha_{tm}]^T,$$

where $()^T$ is the transpose operation, and $\alpha_{tj}$, $j=1, \ldots, m$, are the amplitude and phase (with respect to some fixed reference) of the remote terminal receiver output for a unit power signal transmitted from the jth antenna element of the base station to the remote terminal. Thus, in the absence of any interference and noise, when a signal $y_{ij}(t)=w_{ij}*fn(s(t))$ is sent by the jth antenna element (of a total of m antenna array elements) with the ith transmit weight of the sequence of weights, then the signal $z_t(t)$ at the remote terminal receiver output is $$z_i(t) = fn(s(t)) \sum_{j=1}^{m} w_{ij}^* a_{tj} = fn(s(t)) w_i^* a_t.$$

To optimally send a signal to this remote user with transmit spatial signature $\alpha_t$, one chooses a weight vector w that maximizes the received power at the remote terminal, i.e., the w that maximizes $|w^*\alpha_t|^2$ or $|w^*\alpha_t|$, subject, for example, to a constraint to the total radiated power. This is what is called the "optimal" weight vector in the above paragraph. Denoting such a weight vector as $w_{opt}$, one criterion to use for assessing the effectiveness of the weight vector sequence is to calculate for all of the remote users (each having a particular spatial signature $\alpha_t$), a penalty figure PNLTY defined as $$PNLTY = 20 \log_{10} \left( \frac{|w_{opt}^* a_t|}{\max_i |w_i^* a_t|} \right) \text{ in dB}.$$

A lower value of PNLTY is desired.

In the simulations to test some of the aspects of the invention, each spatial signature (associated with a remote user) is assumed to be made up of a "geometric" part and a "random" part. The geometric part takes into account the relative phase delays between the waves that are transmitted from each element in the antenna array towards the remote user. The remote user is assumed to be in the far field of each of the antenna elements. The geometric transmission medium is assumed isotropic and non-dispersive so that the radiation travels in straight lines to the remote user, and the remote user is assumed to be far away from the base station so that the direction of the remote user from each of the antenna elements is the same angle. In addition, the transmitted signals are assumed to be narrowband and have all the same carrier frequency.

The random part of any spatial signature is made up of real and imaginary parts, these each being Gaussian distributed random variables of 0 mean and some variance. In the simulations, any (complex valued) transmit spatial signature thus is assumed to take on a form $$\alpha_t = \gamma \alpha_{tG} + (1-\gamma) \alpha_{tR}$$

where $\alpha_{tG}$ is the geometric part, $\alpha_{tR}$ is the random part, and γ is a parameter herein called the "clutter rating" and takes on a value of between 0 and 1. Thus, a value of γ=0 means a totally random spatial signature, while a value of γ=1 means a totally geometric spatial signature for the simulations used to test the various embodiments of the invention.

Figure 4A:
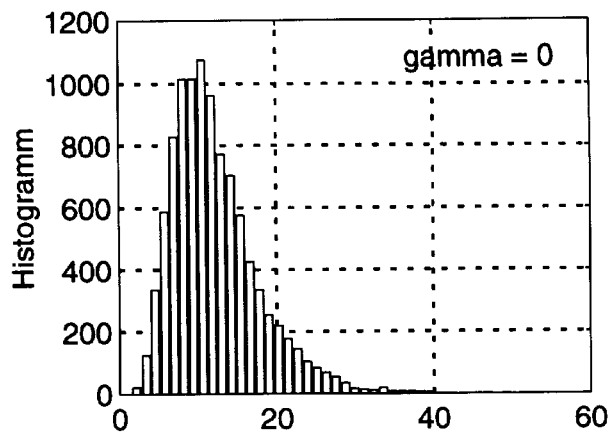
FIG. 4 shows the results of carrying out a simulation without any weight sequencing. Three histograms of a PNLTY measure are shown in FIGS. 4(a), 4(b) and 4(c) for γ (gamma) values of 0 (totally random), 0.5, and 1.0 (totally geometric), respectively, each with a total of 10,000 trials.
Figure 4B:
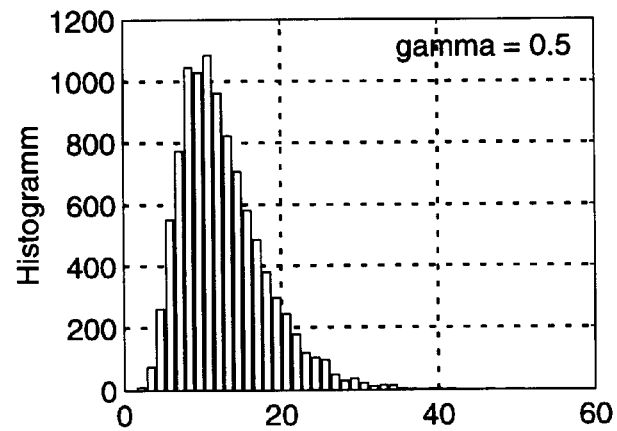
Figure 4C:
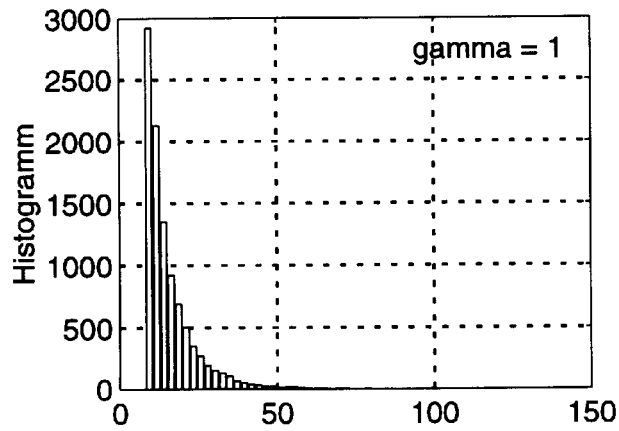

FIG. 4 shows the results of carrying out a simulation without any weight sequencing. The antenna array for the simulations consists of twelve elements spaced uniformly around a circle. Three histograms of the value of PNLTY are shown, each with a total number of N spatial signature values, where N=10,000, are shown in FIGS. 4(a), 4(b) and 4(c) for γ (gamma) values of 0 (totally random), 0.5, and 1.0

(totally geometric), respectively. The horizontal axis is the Penalty measure PNLTY. With no weight sequencing, the mean value of PNLTY is 14.6 dB, 15.0 dB and 29.1 dB for the cases of γ=0, γ=0.5, and γ=1.0, respectively. In addition, a margin of between 16.0 dB to 19.8 dB, depending on how the channel spatial signature is simulated, is necessary to reach 80% of the subscriber units simulated.

Figure 5A:
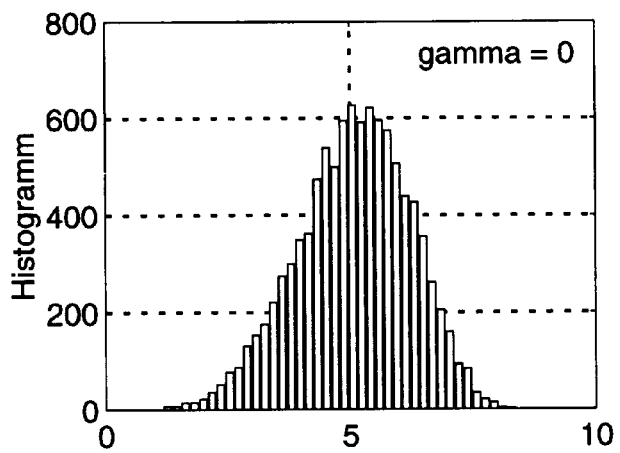
FIGS. 5(a), 5(b) and 5(c) show simulation results for using DFT weight sequencing for the cases of γ=0, γ=0.5, and γ=1.0, respectively, each with 10,000 trials, according to one aspect of the invention.
Figure 5B:
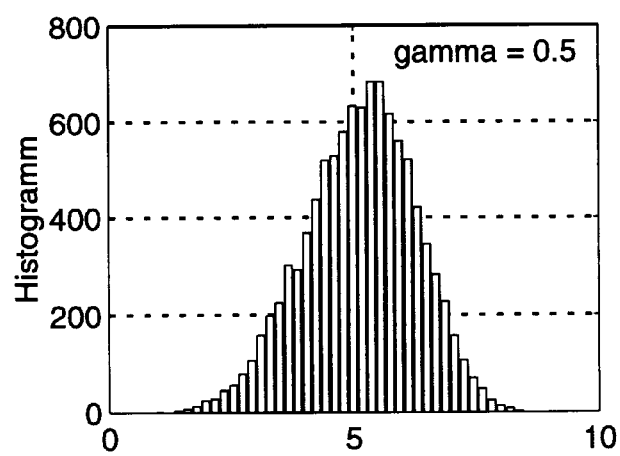
Figure 5C:
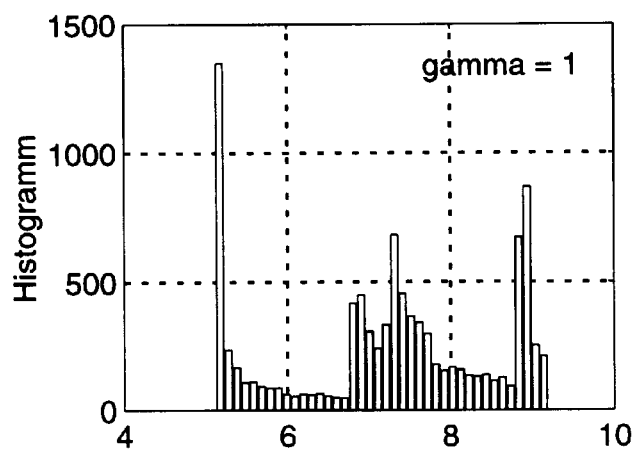

The simulations results when DFT weight sequencing is used can be seen on FIGS. 5(a), 5(b) and 5(c) for the cases of γ=0, γ=0.5, and γ=1.0, respectively with 10,000 trials. With DFT weight sequencing, the mean value of PNLTY is 5.1 dB, 5.2 dB and 7.3 dB for the cases of γ=0, γ=0.5, and γ=1.0, respectively. In addition, the margins necessary to reach 80% of the subscriber units simulated are 6.1 dB to 8.8 dB, depending on gamma. This is a significant improvement from the case of no sequencing.

Figure 6A:
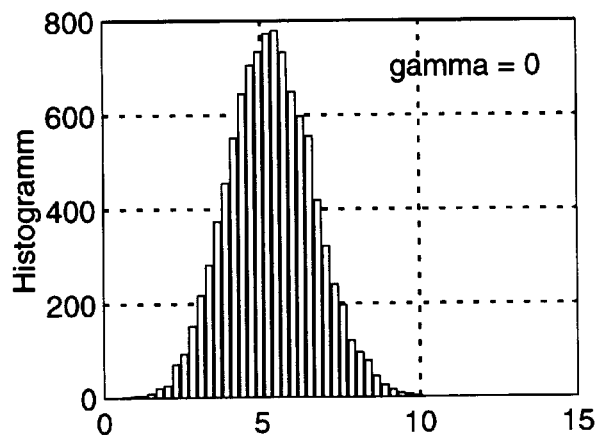
FIGS. 6(a), 6(b) and 6(c) show simulation results for using vector quantized weight vector sequencing for the cases of γ=0, γ=0.5, and γ=1.0, respectively, each with 10,000 trials, according to another aspect of the invention.
Figure 6B:
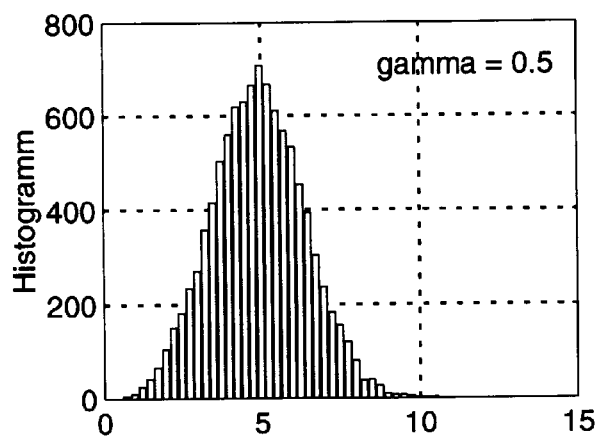
Figure 6C:
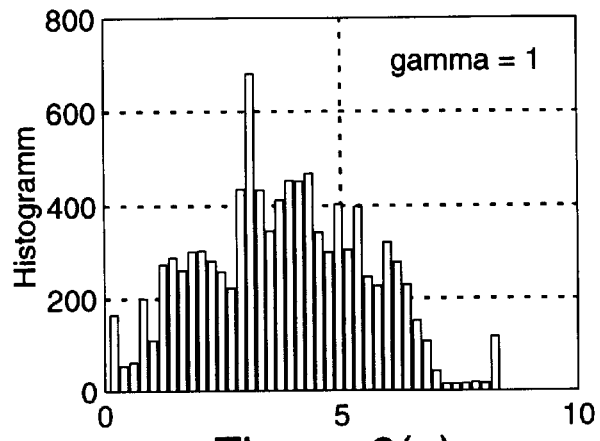

The simulations were carried out also using the vector quantization method of the preferred embodiment, with the number of code vectors n equal to the number of antenna elements m. That is, n=m=12. The uniformly distributed directions weight vectors were used as the initial set of code vectors, and the Euclidean distance (norm) was used as the association criterion. The simulations results can be seen in FIGS. 6(a), 6(b) and 6(c) for the cases of γ=0, γ=0.5, and γ=1.0, respectively, again with 10,000 trials. With such code vector sequencing, the mean value of PNLTY is 5.4 dB, 5.0 dB and 4.0 dB for the cases of γ=0, γ=0.5, and γ=1.0, respectively. In addition, the margins necessary to reach 80% of the subscriber units simulated are 5.3 dB to 6.4 dB, depending on gamma. Again, this is a significant improvement from the case of no sequencing.

As will be understood by those skilled in the art, the skilled practitioner may make many changes in the methods and apparatuses as described above without departing from the spirit and scope of the invention. For example, the communication station in which the method is implemented may use one of many protocols. In addition, several architectures of these stations are possible. Many more variations are possible. The true spirit and scope of the invention should be limited only as set forth in the claims that follow.

What is claimed is:

1. A method for transmitting a downlink signal from a communication station to one or more subscriber units, the communication station including an array of antenna elements, each antenna element coupled to an associated transmit apparatus having an input and an output, the coupling of each antenna element being to the output of its associated transmit apparatus, the associated transmit apparatus inputs coupled to a signal processor, the method comprising:

for each particular signal processing procedure of a set of different signal processing procedures, each of the signal processing procedures being for processing the downlink signal to form a plurality of processed downlink antenna signals, each of the signal processing procedures including weighting the downlink signal in phase and amplitude according to a corresponding weight vector, each processed downlink antenna signal having an intended antenna element in the array, repeating the steps of:

(a) processing the downlink signal according to the particular signal processing procedure to form a particular plurality of processed downlink antenna signals;

(b) transmitting the downlink signal by passing each processed downlink antenna signal of the particular plurality of processed downlink antenna signals to its intended antenna element through the intended antenna element's associated transmit apparatus the set of different signal processing procedures designed to achieve a desirable radiation level at any location in the complete range of azimuths of the antenna array during at least one of the repetitions of step (b) of transmitting, each corresponding weight vector used for weighting in each different processing procedure being a different weight vector of a sequence of different weight vectors, the weighting according to each corresponding weight vector producing the plurality of processed downlink antenna signals, the sequence of weight vectors designed to achieve a desirable radiation level at any location in a desired sector during at least one of the repetitions of step (b) of transmitting.

2. The method according to claim 1 wherein the weight vectors of the sequence of weight vectors are pre-stored in a memory.

3. The method according to claim 1, wherein the weight vectors of the sequence of weight vectors are computed from a set of one or more prototype weight vectors, the set of prototype weight vectors being pre-stored in a memory.

4. The method according to claim 1 wherein the weight vectors of the sequence of weight vectors each have elements that have the same amplitude and have random phase.

5. The method according to claim 1 wherein the elements of each of the weight vectors of the sequence of weight vectors have equal magnitude.

6. The method according to claim 1 wherein the number of weight vectors in the sequence of weight vectors is the same as the number of antennas, the number of antennas denoted by m, and the weight vectors of the sequence of weight vectors are orthogonal.

7. The method according to claim 6 wherein the elements of each of the weight vectors of the sequence of weight vectors have equal magnitude.

8. The method according to claim 6 wherein the weight vectors of the sequence of weight vectors are formed from the rows of a complex valued m-dimensional Walsh-Hadamard matrix.

9. The method according to claim 6 wherein the weight vectors of the sequence of weight vectors are formed from the rows of a real valued m-dimensional Hadamard matrix.

10. The method according to claim 6 wherein the weight vectors of the sequence of weight vectors are formed from the basis vectors of a m-dimensional discrete Fourier transform (DFT).

11. The method according to claim 6 wherein each of the weight vectors of the sequence of different weight vectors is designed to provide a particular desirable radiation pattern within a sub-sector of the overall desired sector, all the sub-sectors covering the overall desired sector, each weight vectors minimizing a cost function of possible weight vectors which includes an expression of the variation from the particular desirable radiation pattern of the radiation pattern within the particular sub-sector resulting from transmitting using the weight vector.

12. The method according to claim 11 wherein the antenna array has elements which are substantially uniformly distributed, a prototype weight vector for one sub-sector is designed, and the other weight vectors of the sequence are shifted versions of the prototype obtained by shifting the prototype weight vector by an amount determined by the angular shift of the sub-sector from the prototype weight vector sub-sector.

13. The method according to claim 11 wherein the antenna array has elements which are substantially uniformly distributed, a prototype weight vector for one sub-sector is designed, and the other weight vectors of the sequence are shifted versions of the prototype obtained by shifting the prototype weight vector by an amount determined by the angular shift of the sub-sector from the prototype weight vector sub-sector.

14. The method according to claim 13 wherein the set of representative weight vectors included in the sequence has fewer weight vectors than the number of known subscriber units.

15. The method according to claim 14 wherein the representative weight vectors are determined from the weight vectors designed for transmission to the known subscriber units, the determining of the representative weight vectors from the designed-for-subscriber-unit weight vectors using a vector quantization clustering method.

16. The method of claim 15 wherein the clustering method includes:
 (i) assigning an initial set of weight vectors as a current set of representative weight vectors;
 (ii) combining each designed-for-subscriber-unit weight vector with its nearest representative weight vector in the current set, nearest according to some association criterion;
 (iii) determining an average measure of the distance between each representative weight vector in the current set and all the weight vectors combined with that representative vector;
 (iv) replacing each representative weight vector in the current set with a core weight vector for all the weight vectors that have been combined with that representative weight vector;
 (v) iteratively repeating steps (ii), (iii) and (iv) until the magnitude of the difference between the average measure in the present iteration and the average distance in the previous iteration is less than a threshold,
 the set of representative weight vectors being the current set when the magnitude of the difference is less than the threshold.

17. The method of claim 16 wherein the association criterion for nearness is the Euclidean distance and the core weight vector is the geometric centroid of all the weight vectors that have been combined with the representative weight vector of the current set of representative weight vectors during that iteration.

18. The method of claim 16 wherein the average measure is the average square of the distance.

19. The method of claim 16 wherein the association criterion used for nearness is the maximal cosine angle and the core weight vector is the principal singular vector obtained from carrying out the singular value decomposition on all the weight vectors that have been combined with the representative weight vector of the present set of representative weight vectors during that iteration.

20. The method of claim 16 wherein the initial set of weight vectors are the unit amplitude weight vectors aimed at different uniformly spaced angles in the desired sector.

21. The method of claim 13 wherein the set of representative weight vectors forms a first sub-sequence of the sequence of weight vectors and the sequence of weight vectors further comprises a second sub-sequence of weight vectors.

22. The method of claim 13 wherein the second sub-sequence comprises a particular weight vector designed to provide a particular desirable radiation pattern in the desired sector, the particular weight vectors minimizing a cost function of possible weight vectors which includes an expression of the variation from the particular desirable radiation pattern of the radiation pattern within the sector resulting from transmitting using the weight vector.

23. The method of claim 22 wherein the particular desirable radiation pattern is a near omnidirectional pattern.

24. The method of claim 22 wherein the second sub-sequence is a set of orthogonal weight vectors.

25. The method according to claim 1 wherein the sequence of weight vectors includes weight vectors designed for transmission to the known subscriber units of the communication station, the designed weight vectors determined from transmit spatial signatures of the known subscriber units of the communication station.

26. A method for transmitting a downlink signal from a communication station to one or more subscriber units, the communication station including an array of antenna elements, each antenna element coupled to an associated transmit apparatus having an input and an output, the coupling of each antenna element being to the output of its associated transmit apparatus, the associated transmit apparatus inputs coupled to a signal processor, the method comprising:
 for each particular signal processing procedure of a set of different signal processing procedures, each of the signal processing procedures being for processing the downlink signal to form a plurality of processed downlink antenna signals, each of the signal processing procedures including weighting the downlink signal in phase and amplitude according to a corresponding weight vector, each processed downlink antenna signal having an intended antenna element in the array, repeating the steps of:
  (a) processing the downlink signal according to the particular signal processing procedure to form a particular plurality of processed downlink antenna signals;
  (b) transmitting the downlink signal by passing each processed downlink antenna signal of the particular plurality of processed downlink antenna signals to its intended antenna element through the intended antenna element's associated transmit apparatus
 the set of different signal processing procedures designed to achieve a desirable radiation level at any location in the complete range of azimuths of the antenna array during at least one of the repetitions of step (b) of transmitting,
 each different procedure of the set of different signal processing procedures also comprising a set of post-processing procedures of a corresponding sequence of different sets of post-processing procedures,
 the corresponding weight vectors being essentially identical for each set of procedures of the sequence of different sets of signal processing procedures, and
 the repetition of step (a) comprising
  (i) weighting the downlink signal according to the corresponding weight vector to form a plurality of downlink antenna signals, and
  (ii) applying a different post-processing procedure of one of the sets of post-processing procedures to each of the downlink antenna signals of the plurality of downlink antenna signals to form each processed downlink antenna signals of the particular plurality of processed downlink antenna signals.

27. The method of claim 26 wherein each set of post-processing procedures of the corresponding sequence of different sets of post-processing procedures comprises applying a different set of phase shifts.

28. The method of claim 27 wherein the phase shifts in each different set are random relative to each other.

29. The method of claim 26 wherein each set of post-processing procedures of the corresponding sequence of different sets of post-processing procedures comprises applying a different set of time delays.

30. The method of claim 26 wherein each post-processing procedure of the corresponding set of different post-processing procedures comprises applying a different frequency offset.

* * * * *

UNITED STATES PATENT AND TRADEMARK OFFICE
CERTIFICATE OF CORRECTION

PATENT NO.    : 6,185,440 B1
DATED         : February 6, 2001
INVENTOR(S)   : Barratt et al.

It is certified that error appears in the above-identified patent and that said Letters Patent is hereby corrected as shown below:

Column 23,
Line 65, before "wherein", delete "claim 13" and insert -- claim 21 --.

Signed and Sealed this

Fifteenth Day of February, 2005

JON W. DUDAS
*Director of the United States Patent and Trademark Office*